United States Patent [19]
Wroblewski

[11] Patent Number: 5,348,162
[45] Date of Patent: Sep. 20, 1994

[54] MACHINE FOR PROCESSING GOODS, ESPECIALLY REFUSE, FOR SORTING IT

[76] Inventor: Franz Wroblewski, Granitvägen 8, S-826 00 Söderhamn, Sweden

[21] Appl. No.: 48,334

[22] Filed: Mar. 23, 1993

Related U.S. Application Data

[63] Continuation-in-part of Ser. No. 720,845, Jul. 15, 1991, abandoned.

[30] Foreign Application Priority Data

Jan. 24, 1989 [SE] Sweden ............... 8900240-6

[51] Int. Cl.⁵ ............................................... B07B 9/00
[52] U.S. Cl. ........................... 209/35; 198/669; 209/44.3; 209/129; 209/631; 209/632; 209/664; 209/667; 209/669; 209/930
[58] Field of Search ............ 209/12, 30, 31, 34, 209/35, 44.1, 44.2, 44.3, 127.1, 129, 629, 631, 632, 664, 667, 669, 683, 930; 241/74, 79.1, 163, 260.1, DIG. 38; 198/662, 669, 676

[56] References Cited

U.S. PATENT DOCUMENTS

| | | | |
|---|---|---|---|
| 1,250,554 | 12/1917 | Bryan et al. | 209/12 |
| 3,458,041 | 7/1969 | Schmid | 209/127.1 X |
| 4,207,177 | 6/1980 | Block | 209/930 X |
| 4,251,353 | 2/1981 | Knoll | 209/127.1 X |
| 4,693,287 | 9/1987 | Wroblewski | 144/208 EX |

FOREIGN PATENT DOCUMENTS 563364  2/1933  Fed. Rep. of Germany ...... 198/213

Primary Examiner—Andres Kashnikow
Assistant Examiner—Joseph A. Kaufman
Attorney, Agent, or Firm—Mcfadden, Fincham

[57] ABSTRACT

A machine for sorting refuse comprises a rotatable drum (1) having several succeeding processing stations (5, 6, 7) located between an inlet (3) and an outlet (4) and each including one or more rotatable shafts (8) the circumferential surfaces of which are equipped with goods-processing projections and which are mounted at openings in the wall of the drum, the processing projections being adapted to cooperate with the edge portions of the drum wall defining the openings, so as to bring about a processing action on goods fed from the inlet towards the outlet. The processing projections of the shafts (8) in a first station (5) most adjacent the inlet (3) are smaller than the corresponding processing projections in the following station (6) in order, in said first station, to separate fine goods, while allowing coarser goods, during the feed of the goods from the inlet towards the outlet along the bottom of the drum, to pass on for separation in a succeeding station or stations.

12 Claims, 3 Drawing Sheets

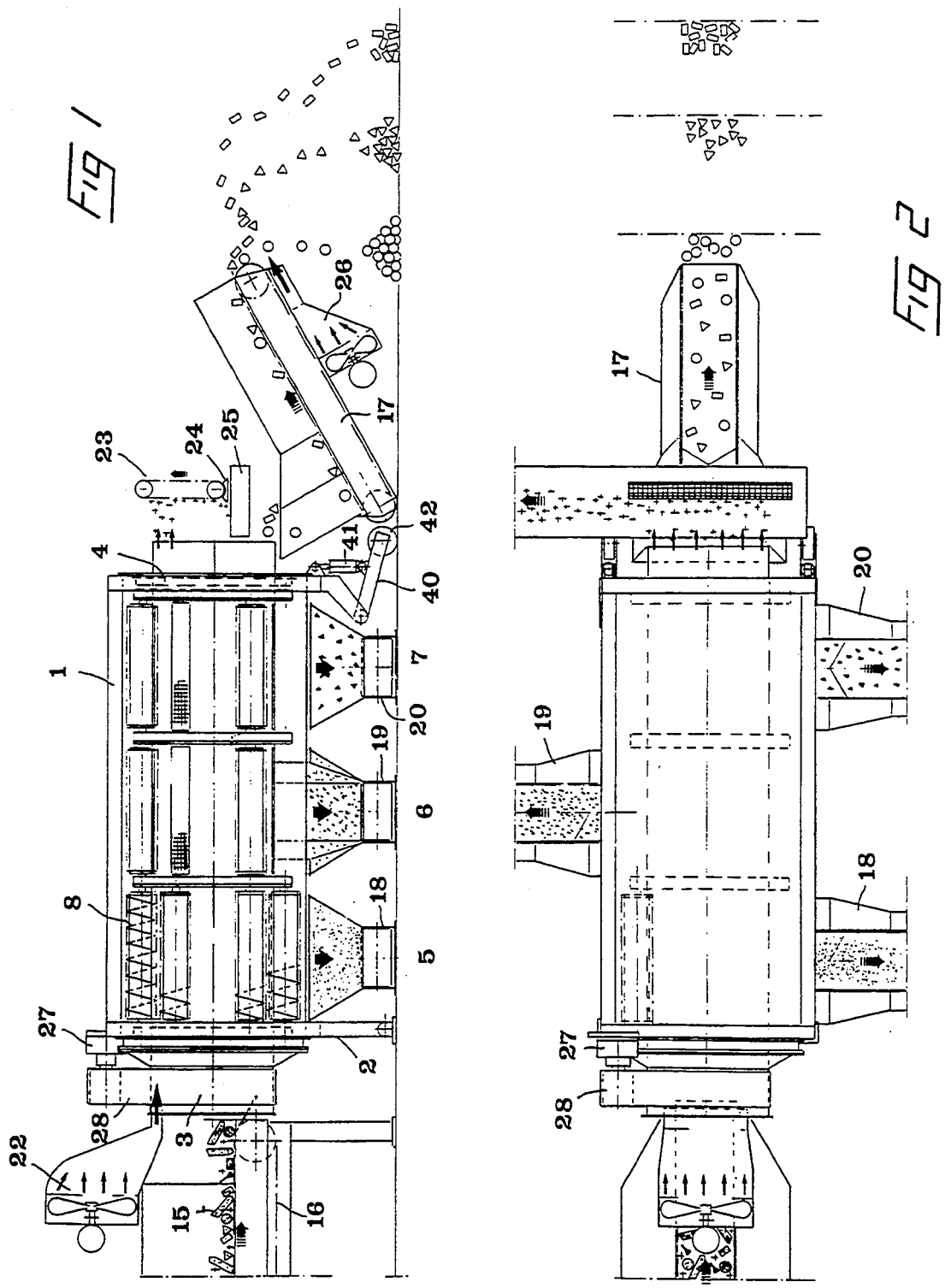

MACHINE FOR PROCESSING GOODS, ESPECIALLY REFUSE, FOR SORTING IT

This application is a continuation-in-part of U.S. application Ser. No. 07/720,845 filed Jul. 15, 1991 now abandoned.

TECHNICAL FIELD OF THE INVENTION

This invention relates to a machine for processing goods, especially refuse, with a view to sorting said goods, comprising at least one rotatable horizontal drum having two or more processing stations provided in succession between an inlet and an outlet at opposite ends of said drum, each of said processing stations comprising one or suitably more rotatable shafts or shaft-like elements whose circumferential surfaces are equipped with projecting goods-processing means and which are mounted at openings in the drum wall, more specifically with the centre axes of the shafts located outside the drum and with said processing means projecting into the drum through said openings, said processing means being adapted to cooperate with the edge portions of the drum wall defining said openings, for exerting a cutting, shearing or clipping action on goods fed through the drum from said inlet towards said outlet, for instance by said processing means.

STATE OF THE ART

A machine of the design generally described above is previously known from SE 8405744-7 (and corresponding EPO-WO 86/02874, CA 1,240,590, U.S. Pat. No. 4,693,287 and NO 159067). This prior art machine is intended and constructed for bundle limbing of trees, that is limbing of whole trees fed in bundles through the machine drum.

BRIEF DESCRIPTION OF THE INVENTION CONCEPT

The present invention aims at developing the prior art machine to the extent that it can be efficiently used for sorting goods, such as refuse, preferably in the form of domestic waste. To this end, the machine according to the invention is characterised in that the processing means of the shafts, in a first station located closest to said inlet, have smaller dimensions than the corresponding processing means in the succeeding, second station in order, in said first station, to remove fine goods while allowing coarser goods, during the feed of the goods from said inlet towards said outlet along the bottom of the drum, to pass on for removal in the succeeding station or stations.

BRIEF DESCRIPTION OF THE ACCOMPANYING DRAWINGS

In the drawings,

FIG. 1 is a longitudinal section of the inventive sorting machine,

FIG. 2 is a top plan view of the machine shown in FIG. 1,

DETAILED DESCRIPTION OF A PREFERRED EMBODIMENT OF THE INVENTION

Figure 3:
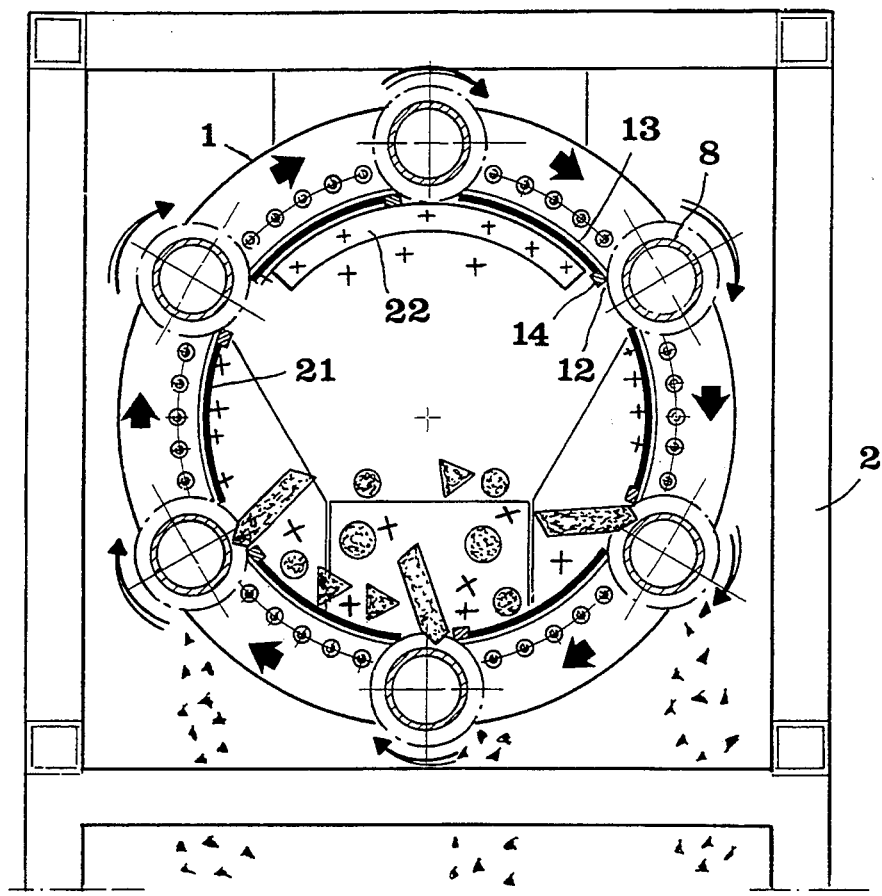
FIG. 3 is an enlarged cross section when viewing to the left in FIG. 1.

In FIGS. 1–3, a rotatable drum generally designated 1 is supported by a frame-like stand generally designated 2. The drum is open at its two opposite ends, forming an inlet 3 and an outlet 4 for the goods to be sorted. Between the inlet 3 and the outlet 4 there are provided three succeeding processing stations 5, 6, 7, each comprising a plurality of rotatable shafts or shaft-like elements 8 (see also FIG. 4) whose circumferential surfaces are equipped with projecting processing means 9, 10 which in the illustrated example consist in known manner of ridges or threads helically extending along the circumferential surface 11 of the shaft. As appears from FIG. 3, six shafts 8 are used in the preferred embodiment, the shafts suitably being equidistantly distributed along the circumference of the drum 1. Each shaft 8 is mounted in connection with a respective opening 12 in the drum wall 13, the processing means 9, 10 being adapted to cooperate with the edge portions of the drum wall defining said opening. Advantageously, at least one of the two opposite, elongate edge portions of the drum wall defining the opening 12 may be provided with a special wearing rail 14 located in the immediate vicinity of the crests of the threads 9, 10. In a manner known per se, the threads 9, 10 will process the goods entering the area between the threads and the wearing rail 14, more specifically in such a manner that the goods is subjected to a shearing, tearing and/or crushing action by the threads. As appears from FIG. 4, one thread 9 has a relatively small pitch along the circumferential surface 11 of the shaft 8 while the other thread 10 has a considerably greater pitch and extends in a direction contrary to that of the first-mentioned thread. Assuming that the thread 9 extends as a right-hand thread along the shaft, then the thread 10 extends as a left-hand thread therealong. In practice, the thread 9 thus principally serves to feed goods supplied into the drum, in the longitudinal direction thereof, while the thread 10 principally serves to shear or cut the goods to pieces against the edge or the rail 14.

For supplying goods 15 to be sorted into the drum 1, there is provided before the inlet 3 a first conveyor 16, such as a belt conveyor, and a second conveyor 17 is provided after the outlet 4 for taking care of goods having passed through the drum. At the three processing stations 5, 6, 7, there are additional conveyors 18, 19, 20 for taking care of goods sorted out at the respective stations. These conveyors, too, may suitably be in the form of belt conveyors which, as illustrated, extend at right angles to the longitudinal axis of the drum.

According to a preferred embodiment of the invention, the drum 1 is provided on its inside with a coating 21 (see FIG. 3) having electrostatic properties, which serves to attract to its surface components, e.g. plastic bags, from the goods fed through the drum, by the action of static electricity. In practice, this coating may consist of arcuate sheets of a suitable plastic, e.g. of the ROBALON type, covering the entire inside of the drum wall 13, with the exception of said openings 12. The unsorted goods 15 supplied into the drum will be located, by the force of gravity, on the bottom of the drum, forming a strand which is fed through the drum from the inlet towards the outlet. The components of the goods which are attracted by the coating 21 will however be entrained by the drum during its rotation and thus be moved to the top portion of the drum. At the top portion of the drum, more specifically in connection with the inlet 3, there is provided a fan generally designated 22 which serves, in the top portion of the drum, to produce an air stream which is directed towards the outlet 4 and removes the components accompanying the coating 21 to the top portion of the drum, for passing these components to a collecting device 23 disposed at the outlet 4. In practice, the collecting device 23 can be implemented in many different ways. In the illustrated example, however, it is assumed to consist of an endless net extending between spaced-apart rollers and continuously driven over these rollers. When the components discharged from the drum by the air stream produced by the fan 22 impinge on the front run of the net, they will adhere thereto and thereafter be scraped off from the net by means of a lower scraper device 24 so as to drop onto a side conveyor 25 for further conveyance to a suitable station. Thus, when sorting domestic waste it is possible primarily to take care of plastic bags or pieces of such bags in the manner and remove them by means of the conveyor 25.

As appears from FIG. 1, the conveyor 17 is arranged with a certain inclination relative to the supporting surface and is provided at its underside with a second fan 26. By the fan assembly 26, it is possible to classify into different fractions the components which drop onto the conveyor and which have different weight, more specifically such that the heavier components drop down in the immediate vicinity of the conveyor while gradually lighter components are blown away by the air stream produced by the fan, thus separating these components in successive fractions according to weight.

According to the inventive principle, the threads 9, 10 of the shafts 8 at the first station 5 nearest the inlet 3 are smaller than the corresponding threads of the shafts at the second and third processing stations 6, 7, respectively. Thus, in refuse sorting machines for domestic waste, the height of the threads at the first station 5 may be 8-12, preferably about 10 mm while the corresponding height of the threads at the second station 6 is 15-35, suitably 20-30 and preferably about 25 mm. The height of the threads of the shafts at the third and last station 7 may be in the range of 20-40, suitably 25-35 and preferably about 30 mm. Since the threads of the shafts at the first station 5 have a relatively small height, only relatively fine goods can enter the spaces between the threads of the shafts and the circumferential surface of the shaft, on the one hand, and the edge portions of the drum wall defining the openings for the shafts, on the other hand, coarser goods passing on through the drum by the feed action provided by the threads 9. When sorting domestic waste, goods, such as food scraps, flowers, coffee-grounds and the like, will be separated at the first station 5, while coarser components, such as cartons, bottles, aluminum cans and the like, will ride on the threads of the shafts without being seized thereby and thus be conveyed onto the next processing station 6. At this station, the threads have a sufficient height to be able to seize at least certain components, such as cartons and the like, but not a sufficient height for bottles and aluminium cans which because of their size will pass on through the drum to the outlet 4 and drop onto the conveyor 17 to be finally classified into different fractions as described above. Thus, heavier bottles will drop down immediately adjacent the conveyor 17 while lighter aluminium cans will be blown farther away by the air stream produced by the fan 26.

Although helical threads may advantageously be used as processing means on the shafts described, it is also conceivable to use other types of processing means with gradually increasing height at the succeeding stations. Thus, it is possible to equip the shafts with a plurality of separate studs or projections which may advantageously be helically distributed along the circumferential surfaces of the shafts so as to obtain the desired throughfeed effect. In such a case, the separate projections may cooperate with toothed wearing rails or edge portions in connection with the shaft openings, such that the projections can pass through the gaps between the teeth of the wearing rails.

It should be pointed out that the drum 1 may advantageously be provided at its inlet end 3 with one or more knives serving to cut up bags of paper and/or plastic, of the type conventionally used for domestic waste.

For rotating the drum 1, there is provided a motor or power source 27 (FIGS. 1 and 2) fixedly mounted on the stand 2 and connected to the drum through a suitable transmission, e.g. a V-belt transmission accommodated in a housing 28. From FIG. 4 appears that the different shafts 8 are automatically drivable by the rotary movement of the drum 1. Thus, each shaft is mounted with a narrowed end portion or journal 29 in a bearing 30 provided on the outside of the drum wall 13. At its free end, the journal 29 is non-rotatably connected to a toothed wheel 31 meshing with one of two annular gear rims or gear sections 32, 33 of a ring gear generally designated 34, which is mounted in a bearing 35 relative to the drum 1. More specifically, the gear rim 32 is an internal gear rim, while the gear rim 33 is located on the outside of the ring gear 34 (composed of two halves 34', 34" joined together by screws or the like 36). The external gear rim 33 of the ring gear 34 meshes with a second toothed wheel 37 mounted on a rotatable shaft 38 of a second drive unit 39, for instance a hydraulic motor with a built-in slip clutch. This drive motor 39 (fixedly mounted on the stand 2 in a suitable place) serves, in a normal state of operation, to maintain the ring gear 34 in a stationary state in which the shafts 8 are automatically driven by the rotation of the drum. In this normal state of operation, the drum is assumed to rotate at a speed of 10-20 rpm, the rotation of the drum being brought about by the motor 27. Since the toothed wheel 31 of the journals 29 mesh with the stationary ring gear 34 and accompany the drum 1 during its rotation, the shafts will of course be caused to rotate in known manner, more specifically at a speed which considerably exceeds the speed of the drum. In practice, the gear ratio of the shafts 8 to the drum 1 may be 4-8:1, suitably 6:1 (thus, if the drum rotates at about 20 rpm, the shafts will rotate at 120 rpm). However, if the ring gear 34 is now caused to rotate in one of two opposite directions of rotation by actuation of the motor 39, the speed of rotation of the shafts 8 can be either increased or decreased depending on the selected direction of rotation of the ring gear 34, more specifically in such a manner that the speed of rotation of the shafts is increased if the ring gear 34 is rotated in a direction contrary to that of the drum 1, and vice versa. By causing the ring gear 34 to rotate in the same direction of rotation as the drum 1 and at a higher speed than the drum, it is even possible to reverse the direction of rotation of the shafts 8, which, in practice, is most valuable because it makes it possible to remove extremely resistant components from the goods that may get stuck in the gaps between the circumferential surfaces of the screw shafts 8 and the edge portions of the openings for the shafts. If the motor 39 is designed with a slip clutch, as is preferred in practice, objects from the flow of goods can be allowed to get stuck in the manner described above without causing any damage since the toothed wheel 31, in the event of an unintentional standstill, will then only entrain the ring gear 34, abolishing the resistance to rotation of the ring gear exerted by the slip clutch in the motor 39.

Figure 4:
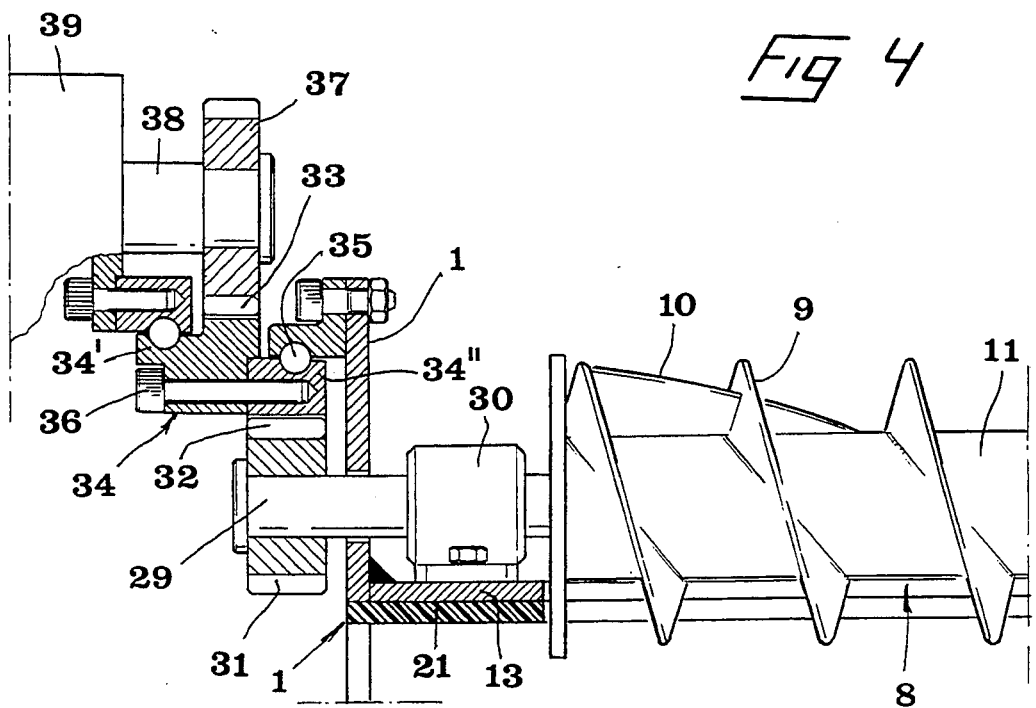
FIG. 4 is an enlarged detail view of a preferred embodiment of the invention and FIG. 5 is another enlarged detail view of the machine.

Further, by the power transmission shown in FIG. 4, it becomes possible to readily vary the speed of rotation of the processing shafts 8, such that the processing and feeding action thereof can be modified according to different types of goods to be sorted.

As appears from FIG. 1, the stand 2 is provided at one end, in this case the rear end, with means 40 for raising and lowering the end of the stand. The lifting means 40 may consist e.g. of arms articulated to the stand and pivotable relative to it by means of hydraulic cylinders 41, the free ends of the arms being provided with wheels 42. By means of these arms, it is possible to vary the inclination of the drum 1 relative to the structure or surface supporting the machine, in order to modify the feed rate of the goods through the drum. Thus, if the rear end of the drum 1 is raised by means of the arms 40, the feed rate will be decreased, bringing about a more intense processing of the goods by means of the screw shafts 8. Similarly, the feed rate of the goods will of course be increased if the rear end of the drum is lowered.

Figure 5:
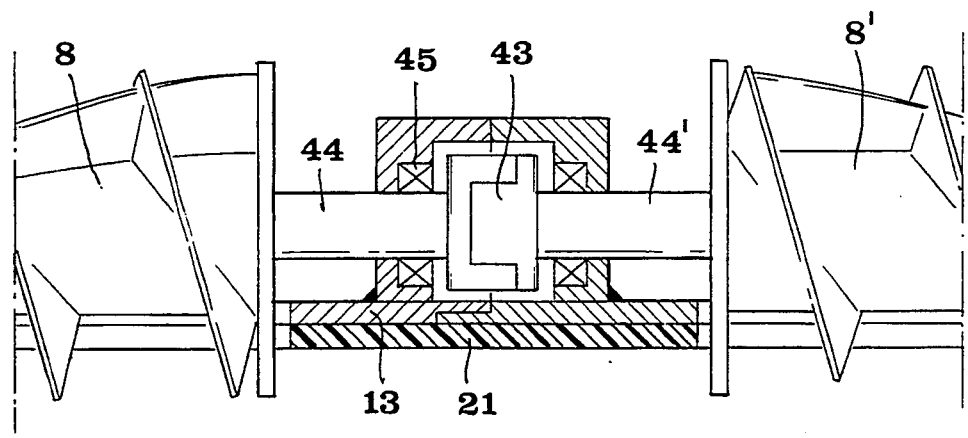

FIG. 5 shows how two processing shafts 8, 8' aligned with each other at two succeeding stations, e.g. stations 5 and 6, can be connected to each other by the intermediary of a jaw clutch 43 including male and female means provided on journals 44, 44' mounted in bearings 45 disposed on the outside of the drum wall 13. In this context, it should also be pointed out that the inventive machine can be made up of separate drum sections. In this case, a desired number of such sections are connected to each other, each section forming one processing station. These drum sections may be either rigidly connected to each other or rotatable in relation to each other and each comprise one or more processing stations. In this context, the essential thing merely is that there are provided between the inlet and the outlet of the assembled drum (or casing), two or more stations with processing means of gradually increasing size.

I claim:

1. In an apparatus for processing and sorting goods in which the apparatus includes at least one rotatable, horizontal drum having an inlet, a spaced apart outlet and at least two successive processing stations between said inlet and said outlet and wherein each of said processing stations includes at least one rotatable shaft means having a circumferential surface provided with projecting processing means for processing said goods, said shaft means having centre axes located outside said drum, said drum having a plurality of openings, said openings having edge portions, said processing means being mounted adjacent said openings and projecting into said drum through said openings whereby said processing means cooperates with said edge portions for exerting an action selected from cutting, shearing and clipping on goods fed through the drum from said inlet towards said outlet, the improvement wherein said drum includes means for rotating said drum, each shaft means being rotatably mounted relative to said drum by mounting means therefor, said mounting means comprising a first toothed wheel non-rotatably connected to a journal on said shaft, a ring gear, a pair of annular gear means associated with said ring gear, said shaft meshing with one of said annular gear means, said ring gear mounted in a bearing relative to said drum, a drive unit having break means associated therewith such that when operated in a normal state, said ring gear is stationary while permitting each of said shafts to rotate at a given speed exceeding the speed at which the drum is rotated, a second toothed wheel, the other of said pair of gear means meshing with said second toothed wheel of said drive unit, and said processing means of a first of said stations located closest to said inlet of said drum is dimensionally smaller relative to the dimensions of successive processing means associated with a succeeding station located in a downstream direction in the direction of the feed of the goods towards said outlet, to thereby facilitate removal of finely-sized goods at said first station while permitting coarser-sized goods to be removed at succeeding stations.

2. An apparatus as claimed in claim 1, wherein said means for rotating said drum comprises means for imparting a rotary movement to said ring gear in a first direction of rotation to thereby increase the speed of rotation of said shaft means.

3. An apparatus as claimed in claim 1, wherein said means for rotating said drum comprises means for imparting a rotary movement to said ring gear in a first direction of rotation to thereby decrease the speed of rotation of said shaft means.

4. The apparatus as claimed in claim 1, said apparatus including at least three said processing stations being adapted for sorting domestic waste, the height of said processing means at said first station being between about 8 and 12 mm, the height of the processing means at the second station being between about 15 to about 35 mm, and the height of the processing means of the third station being between about 20 to about 40 mm.

5. The apparatus as claimed in claim 4, wherein the height of the processing means at said first station is about 10 mm, the height of the processing means at said second station is between 20 to 30 mm and the height of the processing means at said third station is between about 25 to about 35 mm.

6. The apparatus as claimed in claim 1, wherein each shaft means has processing means comprising a first thread helically extending along the circumference of said shaft means.

7. The apparatus as claimed in claim 6, wherein each shaft means further includes a second thread extending in a direction opposite to that of said first thread.

8. The apparatus as claimed in claim 1, wherein said drum further including an inside wall surface provided with an electrostatic coating for electrostatically attracting selected components from said goods by static electricity, said drum further including a first top portion area having removal means for removing said selected components from said drum wall, and conveying means for conveying said selected components in a flow thereof along a second top portion of the drum, which flow is separated from a primary flow of goods advancing along a bottom portion of said drum.

9. The apparatus as claimed in claim 8, wherein said removal means comprises a fan disposed at said inlet of said drum and serving, in the top portion of the drum, to advance a stream of air towards said outlet of said drum and to remove said selected components from the inside of said drum and convey said selected components to a collecting device disposed at said outlet.

10. The apparatus as claimed in claim 9, wherein said apparatus includes a frame mounting said drum, said frame having means for variably adjusting the inclination of the drum whereby the feed rate of goods through the drum is varied.

11. The apparatus as claimed in claim 1, wherein said means for rotating said drum comprises means for imparting a rotary movement to said ring gear in a first direction of rotation to thereby increase the speed of rotation of said shaft means.

12. The apparatus as claimed in claim 1, wherein said means for rotating said drum comprises means for imparting a rotary movement to said ring gear in a first direction of rotation to thereby decrease the speed of rotation of said shaft means.

* * * * *